(12) United States Patent
Yun et al.

(10) Patent No.: US 12,179,137 B2
(45) Date of Patent: Dec. 31, 2024

(54) TUBE-SHAPED PLEATED FILTER MEMBER

(71) Applicant: COWAY CO., LTD., Chungcheongnam-do (KR)

(72) Inventors: Hyun-Jun Yun, Seoul (KR); Byong-Hyoek Lee, Seoul (KR); Jong-Cheol Kim, Seoul (KR); Jin-Min Kim, Seoul (KR); Sang-Hyeon Kang, Seoul (KR)

(73) Assignee: COWAY CO., LTD., Chungcheongnam-Do (KR)

( * ) Notice: Subject to any disclaimer, the term of this patent is extended or adjusted under 35 U.S.C. 154(b) by 0 days.

(21) Appl. No.: 17/642,048

(22) PCT Filed: Sep. 15, 2020

(86) PCT No.: PCT/KR2020/012424
§ 371 (c)(1),
(2) Date: Mar. 10, 2022

(87) PCT Pub. No.: WO2021/054694
PCT Pub. Date: Mar. 25, 2021

(65) Prior Publication Data
US 2024/0033674 A1    Feb. 1, 2024

(30) Foreign Application Priority Data
Sep. 17, 2019 (KR) .......... 10-2019-0114123

(51) Int. Cl.
*B01D 46/52* (2006.01)
*B01D 46/24* (2006.01)

(52) U.S. Cl.
CPC ....... *B01D 46/527* (2013.01); *B01D 46/2403* (2013.01); *B01D 2265/06* (2013.01)

(58) Field of Classification Search
CPC .............. B01D 46/527; B01D 46/2403; B01D 2265/06; B01D 2201/122; B01D 29/21;
(Continued)

(56) References Cited

U.S. PATENT DOCUMENTS

| 5,954,847 A | 9/1999 | Shively et al. |
| 6,598,749 B2 | 7/2003 | Paul et al. |
| 2002/0060183 A1* | 5/2002 | Paul ................ B01D 29/21 |
| | | 210/493.1 |

(Continued)

FOREIGN PATENT DOCUMENTS

| CN | 109794114 A | 5/2019 |
| GB | 2020995 A | 11/1979 |

(Continued)

OTHER PUBLICATIONS

International Search Report for International Application No. PCT/KR2020/012424, mailed Dec. 21, 2020 and English Translation, 6 pages.

(Continued)

*Primary Examiner* — Robert A Hopkins
*Assistant Examiner* — Qianping He
(74) *Attorney, Agent, or Firm* — Guntin & Gust, PLC; Miyoung Shin

(57) ABSTRACT

The tube-shaped pleated filter member may comprise: a filter body having a tube shape such that a filter medium is pleated and is wound; and a support unit. The filter body may comprise outer pleated portions corresponding to the outside of the tube shape, and inner pleated portions corresponding to the inside of the tube shape. An inner virtual line connecting corners of the inner pleated portions may have the shape in which a unit wave shape recessed in the outward direction is repeated. Assuming, that the thickness at a part having the maximum distance between the inner virtual line and the outer virtual line is a first thickness (T1), the first thickness (T1) may have a range defined by [equation 1] with regard to the diameter (D) of the outer virtual line.

$D/15 \leq T1 \leq D/6$.    [Equation 1]

15 Claims, 7 Drawing Sheets

(58) Field of Classification Search
CPC .......................... B01D 29/333; B01D 2201/60;
B01D 29/016; B01D 46/522; B01D
46/0001; B01D 46/523; B31D 5/0082
USPC .......................................................... 55/521
See application file for complete search history.

(56) References Cited

U.S. PATENT DOCUMENTS

| | | | |
|---|---|---|---|
| 2006/0107639 A1* | 5/2006 | Hamlin | .............. B01J 20/14 |
| | | | 55/498 |
| 2013/0306547 A1 | 11/2013 | Norris | |
| 2019/0070531 A1* | 3/2019 | Medina | ............ B01D 29/21 |
| 2019/0143250 A1* | 5/2019 | Oberli | .............. B01D 29/56 |
| | | | 210/493.1 |
| 2020/0398194 A1* | 12/2020 | Savstrom | ......... B01D 46/2411 |

FOREIGN PATENT DOCUMENTS

| | | |
|---|---|---|
| JP | H10244104 A | 9/1998 |
| JP | H11347329 A | 12/1999 |
| JP | 5042408 B2 | 10/2012 |
| KR | 2020100008186 U | 8/2010 |
| KR | 101074530 B1 | 10/2011 |
| WO | 2000040319 A1 | 7/2000 |
| WO | 2010146462 A2 | 12/2010 |
| WO | 2019118260 A1 | 6/2019 |

OTHER PUBLICATIONS

Chinese Office Action of the Corresponding Chinese Application No. 202080065107.8, mailed Dec. 14, 2022 (9 pages)/.

* cited by examiner

TUBE-SHAPED PLEATED FILTER MEMBER

TECHNICAL FIELD

The present disclosure relates to a tube-shaped pleated filter member filtering a fluid, and more particularly, to a tube-shaped pleated filter member having a filter member wound after being pleated.

BACKGROUND ART

Any of various types of filter members may be used in an air purifier, based on a required performance of the air purifier to filter air introduced thereinto.

Among such filter members, a high efficiency particulate air (HEPA) filter may be a kind of high-performance filter that removes a fine particle in the air, and may use a pleated type of filter medium to increase an area of the filter medium (i.e., area through which air actually passes to be filtered).

In recent years, the air purifier may also use the pleated filter medium wound into a tube-type, for example, hollow cylinder (or circular) tube-type to implement high airflow or increase an application area thereof while reducing its overall volume.

A tube-shaped pleated filter member according to the prior art may generally use the pleated filter medium wound with the same width, and having pleated portions on the inside thereof arranged more densely than pleated portions on the outside thereof. Therefore, in the tube-shaped pleated filter member according to the prior art, an angle formed by the pleated portions on the inside thereof may become smaller and a portion in which the pleated portions interfere with each other may occur, thereby increasing pressure differentials in the pleated portions of its inside.

That is, the prior tube-shaped pleated filter member may have the filter medium pleated to have an increased area. However, the pressure differentials may be increased too much for the filter member to fully utilize this large area of the filter medium.

In order to solve this problem, U.S. Patent Application Publication No. 2013/0306547 or International Patent Application Publication No. WO 2010/146462 discloses that more pleated portions are arranged on the outside of the pleated filter member than the inside thereof, or some pleated portions do not extend to the inside of the filter member.

Such configurations may effectively improve pressure differentials inside the filter member. However, the tube-shaped pleated filter member according to the prior art may not sufficiently secure its filtration performance because some filter medium does not extend to the inside of the filter member to reduce an area of the filter medium inside the filter member.

RELATED ART DOCUMENT

Patent Document (Patent Document 1) US 2013/0306547 A1
(Patent Document 2) WO 2010/146462 A2
(Patent Document 3) U.S. Pat. No. 6,598,749 B2

DISCLOSURE

Technical Problem Solution

The present disclosure is devised to solve at least some of the problems of the prior art as described above, and an object of the present disclosure is to provide a tube-shaped pleated filter member which may not only reduce pressure differentials inside a filter body but also have an improved filtration performance by securing sufficient area of a filter medium in the filter member.

Another object of the present disclosure is to provide a tube-shaped pleated filter member which may retain a pleated structure without a separate structure supporting the filter body.

Yet another object of the present disclosure is to provide a tube-shaped pleated filter member which may be easily manufactured.

Technical Solution

According to an exemplary embodiment of the present disclosure, a tube-shaped pleated filter member may include: a filter body having a tube shape in which a filter medium is wound after being pleated and extends, based on a central axis, in a longitudinal direction; and a support unit retaining the shape of the filter body, wherein the filter body includes outer pleated portions corresponding to the outside of the tube shape, and inner pleated portions corresponding to the inside of the tube shape, among the pleated portions of the filter medium, an inner virtual line formed by connecting corners of the inner pleated portions to each other on a plane perpendicular to the central axis of the filter body has a shape in which a unit wave shape recessed from the central axis of the filter body in an outward direction is repeated, and when a first thickness (T1) indicates a thickness of the filter body in a portion having a maximum distance between the inner virtual line and an outer virtual line with regard to the unit wave shape formed by the inner virtual line, the first thickness (T1) has a range of [Equation 1] with regard to a diameter (D) of the outer virtual line:

$$D/15 \leq T1 \leq D/6. \qquad \text{[Equation 1]}$$

Here, the corner of inner pleated portions may thus be exposed to the central axis (C) of the filter body.

In addition, the unit wave shape formed by the inner virtual line may include four or more corners of the inner pleated portions.

In addition, the unit wave shape formed by the inner virtual line may be formed for its distance from the central axis of the filter body to have a value between a first radius (R1) and a second radius (R2), and each of the first radius (R1) and the second radius (R2) may have one specific value.

In addition, the unit wave shape formed by the inner virtual line may have a shape in which its distance from the central axis is gradually reduced or increased from a position corresponding to the first radius (R1) to a position corresponding to the second radius (R2). For example, the wave shape formed by the inner virtual line may have a shape in which an arc is periodically repeated, or a shape in which two sides forming a predetermined angle are periodically repeated.

In addition, the outer virtual line formed by connecting corners of the outer pleated portions to each other on the plane perpendicular to the central axis of the filter body may have a circular shape.

In addition, the diameter (D) of the outer virtual line may range from 100 mm to 500 mm.

In addition, when a second thickness (T2) may indicate a thickness of the filter body in a portion having a minimum distance between the inner virtual line and the outer virtual line with regard to the unit wave shape formed by the inner virtual line, the second thickness (T2) has a range of [Equation 2] with regard to the first thickness (T1):

$$T1/2 \leq T2 \leq T1/1.2. \qquad \text{[Equation 2]}$$

In addition, the number (NW) of the unit wave shape formed by the inner virtual line may have a range of [Equation 3] with regard to the diameter (D) of the outer virtual line:

$$D/33 \leq NW \leq D/7. \qquad \text{[Equation 3]}$$

In addition, a distance (P) between the corners of the inner pleated portions may have a value between 3 mm and 5 mm.

In addition, the filter medium may be formed by stacking a plurality of filter materials on each other.

Meanwhile, the support unit may be formed by curing an adhesive member partially applied to at least one surface of the filter medium, and the adhesive members may be applied to a plurality of locations while being spaced apart from each other in the longitudinal direction of the filter body.

Here, the adhesive member may be applied over the valley and peak formed by the inner pleated portions, and on the contrary, the adhesive member may be applied to correspond to a shape of the inner virtual line.

In addition, the support unit may include a cover member positioned on both sides of the filter body to surround and support both inner and outer circumferential surfaces of the filter body.

Advantageous Effects

According to an exemplary embodiment of the present disclosure having such a configuration, the inside of the filter body may have a shape in which the unit wave shape recessed from the central axis in the outward direction is repeated, thereby not only improving the pressure differentials inside the filter body but also sufficiently securing the area of the filter medium area inside the filter body to sufficiently improve the filtration performance of the entire filter body.

In particular, according to an exemplary embodiment of the present disclosure, the tube-shaped pleated filter member may have at least a portion of the optimized diameter of the filter body, thickness of the pleated portion, number of the unit wave shape and distance between the corners of the inner pleated portions, thereby improving the pressure differentials and optimally utilizing the area of the filter medium. In addition, it is possible to improve processability of the filter medium such as the pleating processing in which the filter medium is pleated and a winding processing in which the pleated filter medium is wound into the tube shape, and the filter body may thus be easily manufactured.

In addition, according to an exemplary embodiment of the present disclosure, the filter medium may be wound after being pleated using the adhesive member such as the hot melt, and then retain its shape, thereby minimizing the structure that acts as the blowing resistance to improve the blowing efficiency.

BEST MODE

Figure 1:
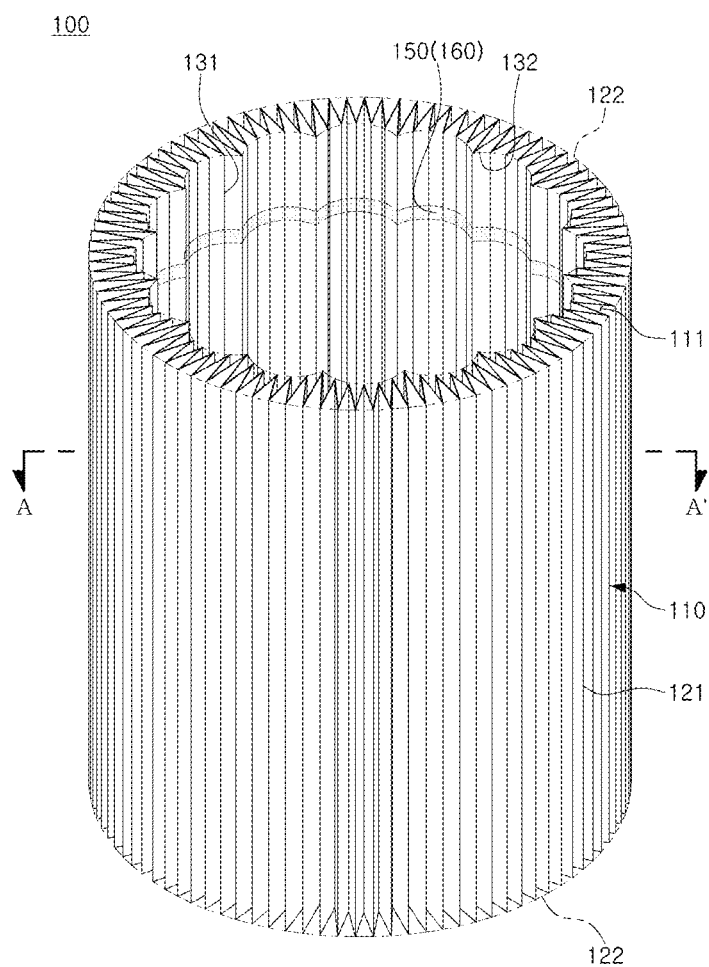
FIG. 1 is a perspective view of an example of a tube-shaped pleated filter member according to the present disclosure.

Hereinafter, an exemplary embodiment of the present disclosure is described with reference to the accompanying drawings. However, an exemplary embodiment of the present disclosure may be implemented in any of various different forms, and the scope of the present disclosure is not limited to an exemplary embodiment described below. In addition, an exemplary embodiment in the present specification is provided to more fully explain the present disclosure to a person having average knowledge in the art. In the drawings, shapes, sizes and the like, of components may be exaggerated for clarity.

In addition, singular forms in the present specification are intended to include plural forms unless explicitly indicated otherwise, and the same reference numerals throughout the description denote the same elements or corresponding elements.

Hereinafter, an exemplary embodiment of the present disclosure is described with reference to the drawings.

Figure 2:
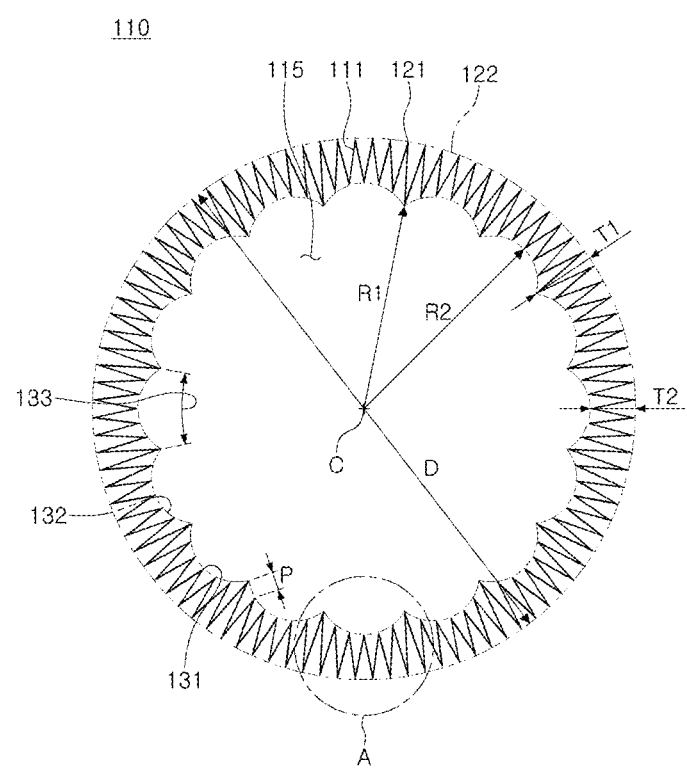
FIG. 2 is a cross-sectional view taken along line A-A' of FIG. 1.
Figure 3:
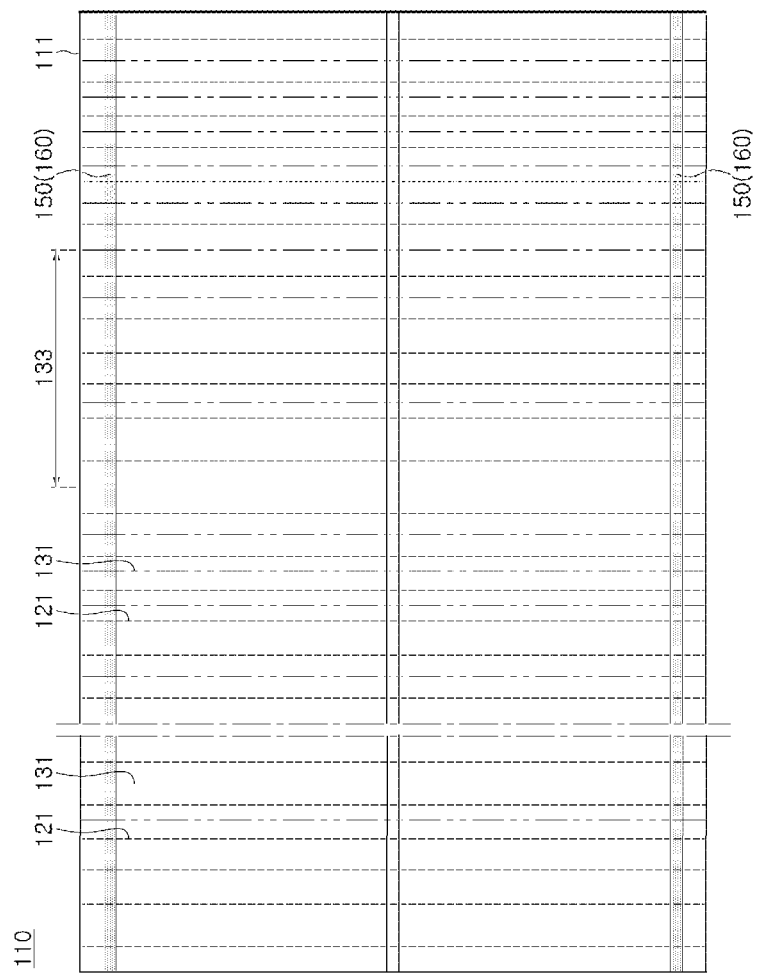
FIG. 3 is an exploded view showing a developed state of the tube-shaped pleated filter member shown in FIG. 1.
Figure 4:
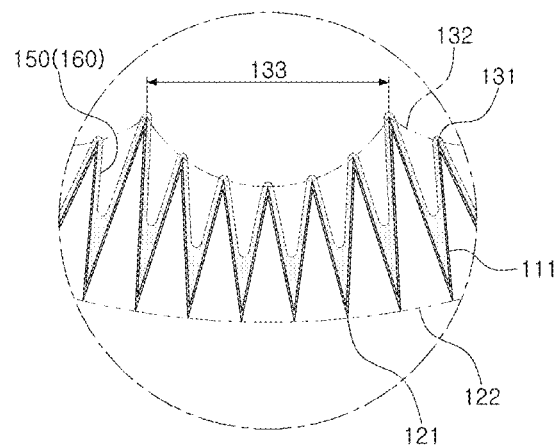
FIG. 4 is an enlarged view of an example of portion "A" of FIG. 2.
Figure 5:
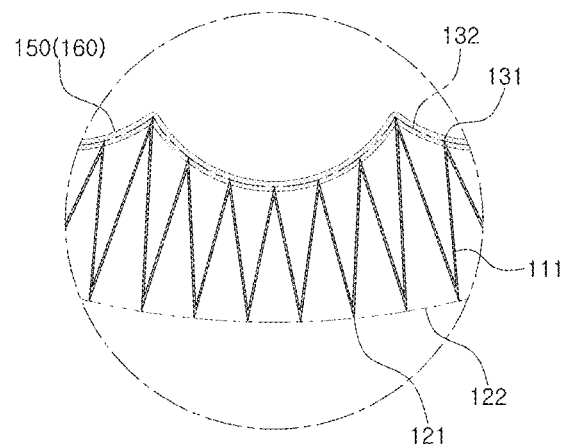
FIG. 5 is an enlarged view of a modified example of portion "A" of FIG. 2.
Figure 6:
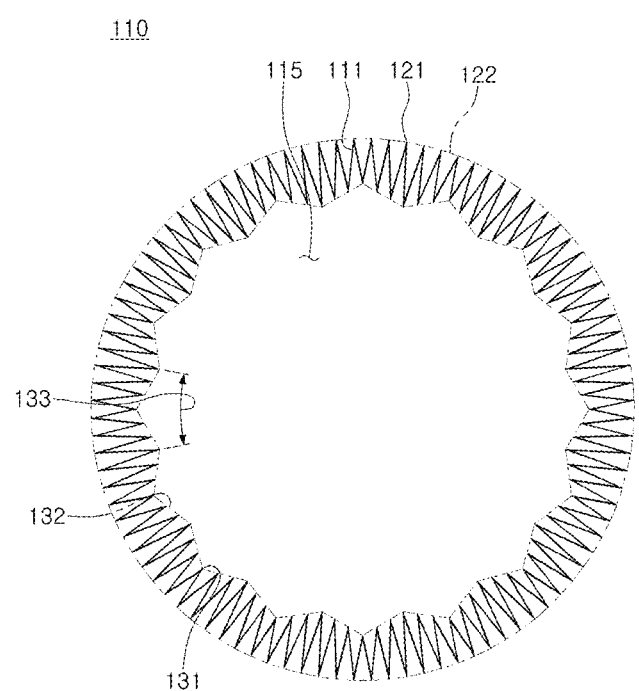
FIG. 6 is a cross-sectional view showing a modified example of a filter body shown in FIG. 2.
Figure 7:
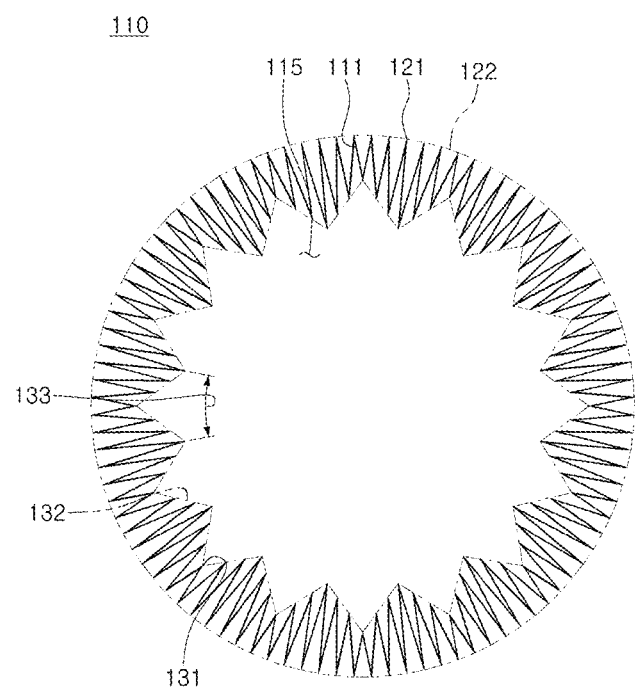
FIG. 7 is a cross-sectional view showing another modified example of the filter body shown in FIG. 2.
Figure 8:
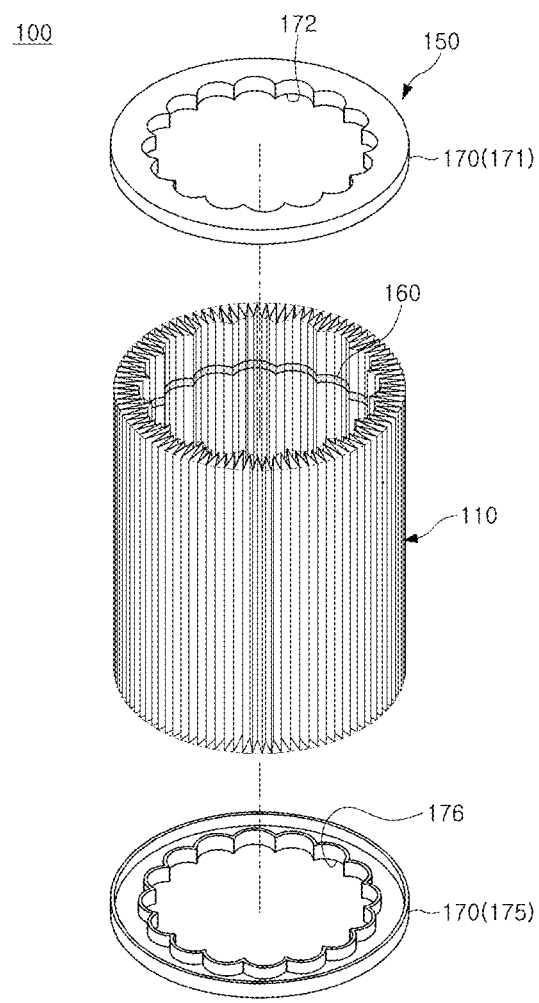
FIG. 8 is an exploded perspective view of another example of the tube-shaped pleated filter member according to the present disclosure.

FIG. 1 is a perspective view of an example of a tube-shaped pleated filter member 100 according to the present disclosure; FIG. 2 is a cross-sectional view taken along line A-A' of FIG. 1; FIG. 3 is an exploded view showing a developed state of the tube-shaped pleated filter member 100 shown in FIG. 1; FIG. 4 is an enlarged view of an example of portion "A" of FIG. 2; and FIG. 5 is an enlarged view of a modified example of portion "A" of FIG. 2. In addition, FIGS. 6 and 7 are cross-sectional views each showing a modified example of a filter body 110 shown in FIG. 2; and FIG. 8 is an exploded perspective view of another example of the tube-shaped pleated filter member 100 according to the present disclosure.

As shown in FIG. 1, the tube-shaped pleated filter member 100 according to an exemplary embodiment of the present disclosure may include the filter body 110 and a support unit 150.

Referring to FIGS. 1 through 4, the filter body 110 may have a tube shape in which a filter medium 111 is wound after being pleated and extends with respect to a central axis (C) in a longitudinal direction, and has a hollow portion 115 formed the inside thereof. That is, the filter body 110 may have the tube shape in which the hollow portion 115 is formed by bonding both ends of the pleated filter medium 111 as shown in FIG. 3. Here, the filter body 110 may have a circular tube shape, and is not limited thereto. The filter body 110 may have an oval tube shape or a polygonal tube shape.

In addition, the filter medium 111 may be a filter medium for a dust collection filter or filter medium for a high efficiency particulate air (HEPA) filter, which is pleated to increase an area of the filter medium. However, the type and material of the filter medium 111 may not be limited as long as the filter medium 111 is pleated as a filter filtering air introduced thereinto.

In addition, the filter medium 111 may be used alone as the filter medium for a HEPA filter. However, the filter medium 111 is not limited thereto, and may use a plurality of filter materials stacked on each other. For example, the filter medium for a HEPA filter and the filter medium for a dust collection filter may be stacked together or may use two types of the filter medium for a HEPA filter, which have different pore sizes and stacked on each other.

In addition, the filter body 110 may include outer pleated portions 121 corresponding to the outside of its tube shape and inner pleated portions 131 corresponding to the inside of its tube shape, among the pleated portions of the filter medium 111. These outer pleated portions 121 and inner pleated portions 131 may be elongated in the longitudinal direction of the filter medium 111 as shown in FIG. 3. For reference, in FIG. 3, the outer pleated portions 121 are indicated by dotted lines, the inner pleated portions 131 are indicated by double-dotted lines, and the inner pleated portions 131 and the outer pleated portions 121 are alternately repeated.

In addition, as shown in FIGS. 1 and 2, an inner virtual line 132 may be formed by connecting corners of the inner pleated portions 131 to each other on a plane perpendicular to the central axis (C) of the filter body 110, and an outer virtual line 122 may be similarly formed by connecting corners of the outer pleated portions 121 to each other. Here, in the present specification including the claims, the 'inner virtual line 132' and the 'outer virtual line 122' may refer to a shape of a curved or straight line entirely formed when the corners of the pleated portions 121 or 131 are connected to each other, and may not be limited to a shape connecting the adjacent corners with straight lines.

In addition, when the filter body 110 has a circular tube shape, the outer virtual line 122 may have a circular shape, and the inner virtual line 132 may have a shape in which a unit wave shape 133 recessed from the central axis (C) of the filter body 110 in an outward direction is repeated.

The unit wave shape 133 formed by the inner virtual line 132 may be formed for its distance from the central axis (C) of the filter body 110 to have a value between a first radius (R1) and a second radius (R2), and each of the first radius (R1) and the second radius (R2) may have one specific value.

Accordingly, the unit wave shape 133 formed by the inner virtual line 132 may have a shape in which its distance from the central axis (C) is gradually reduced or increased from a position corresponding to the first radius (R1) to a position corresponding to the second radius (R2).

For example, as shown in FIG. 2, when the first radius (R1) has a smaller value than the second radius (R2), the unit wave shape 133 formed by the inner virtual line 132 may have a shape in which its distance from the central axis (C) is gradually increased from the position corresponding to the first radius (R1) to the position corresponding to the second radius (R2), whereas its distance from the central axis (C) is gradually reduced from the position corresponding to the second radius (R2) to the position corresponding to the first radius (R1).

For example, the wave shape 133 formed by the inner virtual line 132 may have a shape in which an arc is periodically repeated as shown in FIG. 2, or a shape in which two sides forming a predetermined angle are periodically repeated as shown in FIGS. 6 and 7. FIGS. 6 and 7 each show the same number of unit wave shapes 133 but different angles, and the number or shape of the unit wave shape 133 may be variously changed.

As described above, the inner virtual line 132 may have a shape in which the unit wave shape 133 recessed from the central axis (C) of the filter body 110 in the outward direction is repeated, thereby improving the pressure differentials inside the filter body 110 compared to a filter structure that is pleated with the same width according to a prior art.

In addition, as shown in FIG. 2, the recessed unit wave shape 133 may be repeated in the inside of the filter body 110, and the corner (peak) of inner pleated portions 131 may thus be exposed to the central axis (C) of the filter body 110. Accordingly, the corners of the inner pleated portions 131 may not interfere with each other, and in addition to the corner (peak) of the inner pleated portions 131, an area in contact with air may be sufficiently formed in a valley portion between the peaks. Therefore, it is possible to not only improve the pressure differentials inside the filter body 110 described above, but also fully utilize the area of the filter medium 111. That is, the filter member according to an exemplary embodiment of the present disclosure may sufficiently extend to the inside of the inner pleated portions 131 of the filter body 110, thereby increasingly utilizing the filter medium area.

Meanwhile, the prior art suggests a structure in which the filter member has a zigzag (W) shape by alternately increasing or reducing a width of the pleated portion (i.e., distance between the outer pleated portions and the inner pleated portions) in order to improve the pressure differentials or prevent the interference between the inside portions. In this case, a gap inside the filter member may become increased more than necessary and an amount of the filter medium extending to the inside of the filter member may thus be reduced (i.e. area of the filter medium may be reduced), thereby making it difficult to secure a sufficient filtration performance.

However, in the pleated filter member 100 according to an exemplary embodiment of the present disclosure, the unit wave shape 133 formed by the inner virtual line 132 may include four or more corners of the inner pleated portions 131 (referring to FIGS. 2 and 4, the unit wave shape 133 includes six corners of the inner pleated portions), and the area of the filter medium 111 extending to the inside of the filter body 110 may thus be sufficiently secured, thereby simultaneously achieving the improved pressure differentials and the improved filtration performance.

In addition, the support unit 150 may function to retain the tube shape of the filter body 110 after the filter body 110 is pleated and wound up. The support unit 150 may be formed by curing an adhesive member 160 partially applied to at least one surface of the filter medium 111 as shown in FIG. 3. FIGS. 3 through 5 show that the shape of the filter member in which the adhesive member 160 is applied only to one surface (inner surface) of the filter medium 111. However, the adhesive member 160 may be applied to both surfaces (inner and outer surfaces) of the shape filter medium 111 to firmly retain the pleated shape of the filter body 110.

In addition, the adhesive members 160 may be applied to a plurality of locations while being spaced apart from each other in the longitudinal direction of the filter body 110. For example, as shown in FIG. 3, the adhesive members 160 may respectively be applied to the top, middle and bottom of the filter body 110 in the straight line. However, the number and shape of the portion to which the adhesive member 160 is applied are not limited thereto. However, the portion where the adhesive member 160 is applied may act as a resistance when blowing air, and the number and thickness of the portion to which the adhesive member is applied may thus be minimized as long as the pleated shape of the filter body 110 is retained. Meanwhile, when the adhesive member 160 is applied to both surfaces of the filter medium, the adhesive member 160 on one surface and the adhesive member 160 on the other surface may be applied at different heights.

The adhesive member 160 may be made of, for example, hot melt cured after being applied in a molten state, and a variety of materials and compositions may be used as long as the pleated shape of the filter body 110 is retained.

Meanwhile, the adhesive member 160 used as the support unit 150 may be applied over the valley and peak (corner) formed by the inner pleated portions 131 as shown in FIG. 4 in order to easily retain the pleated shape of the filter body 110 after being applied to the filter medium 111. In addition, to easily apply the adhesive member, the pleated filter medium 111 including each pleated portion having a predetermined width may be spread again to be in the developed state shown in FIG. 3, and the adhesive member 160 may thus be applied to the surface of the filter medium 111 in a straight line shape. As described above, the adhesive member 160 may be applied and the filter medium 111 may then be pleated again to have the tube shape. In this case, as shown in FIG. 4, the adhesive member 160 may be cured over the peaks and valleys formed by the inner pleated portions 131.

However, the adhesive member 160 is not limited to being applied in the manners shown in FIGS. 3 and 4. As shown in FIG. 5, the adhesive member 160 may be applied to connect the corners of the inner pleated portions 131 to each other, that is, to correspond to a shape of the inner virtual line 132.

As described above, according to an exemplary embodiment of the present disclosure, the filter medium 111 may be wound after being pleated using the adhesive member 160 such as the hot melt, and then retain its shape, thereby minimizing a separate structure that acts as a blowing resistance to improve a blowing efficiency.

However, the pleated filter member 100 according to an exemplary embodiment of the present disclosure does not completely exclude that the separate structure is installed on the support unit 150. As shown in FIG. 8, the pleated filter member 100 may also include a cover member 170 positioned on both sides (top and bottom) of the filter body 110 to surround and support both inner and outer circumferential surfaces of the filter body 110. The cover member 170 may include an upper cover 171 having an upper opening 172 supporting an upper inner circumferential surface of the filter body 110 and a lower cover 175 having a lower opening 176 supporting a lower inner circumferential surface of the filter body 110. In addition, the pleated filter member 100 according to an exemplary embodiment of the present disclosure may have only the cover member 170 as the support unit 150.

Next, the description describes a specific shape setting of the tube-shaped pleated filter member 100 according to an exemplary embodiment of the present disclosure.

First, a diameter (D) of the outer virtual line 122 may range from 100 mm to 500 mm.

When the diameter (D) of the outer virtual line 122 is less than 100 mm, a perimeter (circumference) of the inner virtual line 132 and that of the outer virtual line 122 may become shorter. In this case, when the adhesive member 160 is applied to the filter medium 111 and the filter medium 111 is then formed into the tube shape, a bonding portion of the filter medium may be broken or torn, thus making it difficult to manufacture the pleated filter member 100.

Meanwhile, when the diameter (D) of the outer virtual line 122 is greater than 100 mm, there is no significant difference between the perimeter (circumference) of the inner virtual line 132 and the perimeter (circumference) of the outer virtual line 122. In this case, there may be no significant loss of the pressure differentials due to the inner pleated portions 131 or no significant interference between the inner pleated portions 131, thereby cutting the effect of the present disclosure obtained by repeating the recessed unit wave shape 133, by half.

In addition, when a first thickness (T1) indicates a thickness of the filter body 110 in a portion having a maximum distance between the inner virtual line 132 and the outer virtual line 122 with regard to the unit wave shape 133 formed by the inner virtual line 132, the first thickness (T1) may have a range of [Equation 1] with regard to the diameter (D) of the outer virtual line 122:

$$D/15 \leq T1 \leq D/6. \qquad \text{[Equation 1]}$$

If the first thickness (T1) is smaller than D/15, the thickness of the filter body 110 may become too small, and accordingly, there may be no significant difference between the perimeter (circumference) of the inner virtual line 132 and the perimeter (circumference) of the outer virtual line 122. In this case, there may be no significant loss of the pressure differentials due to the inner pleated portions 131 or no significant interference between the inner pleated portions 131, thereby cutting the effect obtained by repeating the recessed unit wave shape 133, by half.

On the contrary, if the first thickness (T1) is larger than D/6, the thickness of the filter body 110 and the area of the filter medium corresponding thereto may become too large. In this case, the overall pressure loss may be significantly increased, and the perimeter (circumference) of the inner virtual line 132 may become too small compared to the perimeter (circumference) of the outer virtual line 122. Accordingly, when the adhesive member 160 is applied to the filter medium 111 and the filter medium 111 is then formed into the tube shape, a bonding portion of the filter medium, around the inner virtual line 132, may be broken or torn, thus making it difficult to manufacture the pleated filter member 100.

In addition, when a second thickness (T2) indicates a thickness of the filter body 110 in a portion having a minimum distance between the inner virtual line 132 and the outer virtual line 122 with regard to the unit wave shape 133 formed by the inner virtual line 132, the second thickness (T2) may have a range of [Equation 2] with regard to the first thickness (T1):

$$T1/2 \leq T2 \leq T1/1.2. \qquad \text{[Equation 2]}$$

If the second thickness T2 is smaller than T1/2, a width of the pleated portion corresponding to the second thickness may be too small, thus making a pleating processing impossible.

On the contrary, if the second thickness (T2) is greater than T1/1.2, there may be no significant difference from the prior filter structure formed by winding the pleated filter medium 111 with the same width. In this case, there may be insignificant effect of improving the loss of the pressure differentials due to the inner pleated portions 131 or improving the interference between the inner pleated portions 131.

In addition, the number (NW) of the unit wave shape 133 formed by the inner virtual line 132 may have a range of [Equation 3] with regard to the diameter (D) of the outer virtual line 122:

$$D/33 \leq NW \leq D/7. \qquad \text{[Equation 3]}$$

If the number (NW) of the unit wave shape 133 formed by the inner virtual line 132 is smaller than D/33, there may be no significant difference from a shape of the prior case in which the inner virtual line 132 forms a circle. In this case, the effect of improving the pressure differentials or improving the interference due to the introduction of unit wave shape 133 may be extremely small.

On the contrary, if the number (NW) of the unit wave shape 133 formed by the inner virtual line 132 is greater than D/7, the number of the unit waves may become too large, thus making it difficult to perform the pleating process and an entire manufacturing process. In particular, if the number of the unit waves is too large, the number of the inner pleated portions 131 included in the unit wave shape 133 may be reduced. In this case, as described above, the gap inside the filter body 110 may become increased more than necessary and the amount of the filter medium extending to the inside of the filter member may thus be reduced, thereby making it difficult to secure the sufficient filtration performance.

Finally, the number of the corners formed by the inner pleated portions 131 may be set to adjust the area of the filter medium according to the required filtration performance. In this case, a distance (P) between the corners of the inner pleated portions 131 of the inner pleated portions 131 (i.e., straight line distance between the corners as shown in FIG. 2) may have a value between 3 mm and 5 mm.

If the distance (P) is less than 3 mm, it is difficult to secure a space where air may be easily introduced to the valley formed by the inner pleated portions 131, and if the distance (P) is larger than 5 mm, it is impossible to secure the sufficient area of the filter medium, and there may thus be a limitation in efficiently implementing the filtration performance.

As described above, the tube-shaped pleated filter member 100 according to an exemplary embodiment of the present disclosure may have at least a portion of the optimized diameter (D) of the filter body 110, thickness (T1 or T2) of the portion forming the pleated portion, number (NW) of the unit wave shape 133 and distance (P) between the corners of the inner pleated portions 131, thereby improving the pressure differentials and optimally utilizing the area of the filter medium. In addition, it is possible to improve processability of the filter medium such as the pleating processing in which the filter medium 111 is pleated and a winding processing in which the pleated filter medium 111 is wound into the tube shape, and the filter body 110 may thus be easily manufactured.

While an exemplary embodiment has been shown and described above, it will be apparent to those skilled in the art that modifications and variations could be made without departing from the scope of the present disclosure as defined by the appended claims.

DESCRIPTION OF REFERENCE NUMERALS

100 . . . PLEATED FILTER MEMBER, 110 . . . FILTER BODY, 111 . . . FILTER MEDIUM,
115 . . . HOLLOW PORTION, 121 . . . OUTER PLEATED PORTION, 122 . . . OUTSIDE VIRTUAL LINE
131 . . . INNER PLEATED PORTION, 132 . . . INNER VIRTUAL LINE, 133 . . . UNIT WAVE SHAPE
150 . . . SUPPORT UNIT, 160 . . . ADHESIVE MEMBER, 170 . . . COVER MEMBER, 171 . . . UPPER COVER
172 . . . UPPER OPENING, 175 . . . LOWER COVER, 176 . . . LOWER OPENING, C . . . CENTRAL AXIS,
D . . . OUTER DIAMETER, R1 . . . FIRST RADIUS, R2 . . . SECOND RADIUS
P . . . DISTANCE BETWEEN THE CORNERS OF THE INNER PLEATED PORTIONS, T1 . . . FIRST THICKNESS,
T2 . . . SECOND THICKNESS

The invention claimed is:

1. A tube-shaped pleated filter member comprising:
a filter body having a tube shape in which a filter medium is wound after being pleated and extends, based on a central axis, in a longitudinal direction; and
a support unit retaining the tube shape of the filter body,
wherein the filter body includes outer pleated portions corresponding to an outside of the tube shape, and inner pleated portions corresponding to an inside of the tube shape, among the pleated portions of the filter medium,
an inner virtual line formed by connecting corners of the inner pleated portions to each other on a plane perpendicular to the central axis of the filter body has a shape in which a unit wave shape recessed from the central axis of the filter body in an outward direction is repeated, and
when a first thickness (T1) indicates a thickness of the filter body in a portion having a maximum distance between the inner virtual line and an outer virtual line with regard to the unit wave shape formed by the inner virtual line, the first thickness (T1) has a range of [Equation 1] with regard to a diameter (D) of the outer virtual line:

$$D/15 \leq T1 \leq D/6. \qquad \text{[Equation 1]}$$

2. The tube-shaped pleated filter member of claim 1, wherein the unit wave shape formed by the inner virtual line includes four or more corners of the inner pleated portions.

3. The tube-shaped pleated filter member of claim 2, wherein the unit wave shape formed by the inner virtual line is formed for its distance from the central axis of the filter body to have a value between a first radius (R1) and a second radius (R2), and
each of the first radius (R1) and the second radius (R2) has one specific value.

4. The tube-shaped pleated filter member of claim 3, wherein the unit wave shape formed by the inner virtual line has a shape in which its distance from the central axis is gradually reduced or increased from a position corresponding to the first radius (R1) to a position corresponding to the second radius (R2).

5. The tube-shaped pleated filter member of claim 4, wherein the unit wave shape formed by the inner virtual line has a shape in which an arc is periodically repeated, or a shape in which two sides forming a predetermined angle are periodically repeated.

6. The tube-shaped pleated filter member of claim 1, wherein the outer virtual line formed by connecting corners of the outer pleated portions to each other on the plane perpendicular to the central axis of the filter body has a circular shape.

7. The tube-shaped pleated filter member of claim 6, wherein the diameter (D) of the outer virtual line ranges from 100 mm to 500 mm.

8. The tube-shaped pleated filter member of claim 1, wherein when a second thickness (T2) indicates a thickness of the filter body in a portion having a minimum distance between the inner virtual line and the outer virtual line with regard to the unit wave shape formed by the inner virtual line, the second thickness (T2) has a range of [Equation 2] with regard to the first thickness (T1):

$$T1/2 \leq T2 \leq T1/1.2.$$ [Equation 2]

9. The tube-shaped pleated filter member of claim 1, wherein a number (NW) of the unit wave shape formed by the inner virtual line has a range of [Equation 3] with regard to the diameter (D) of the outer virtual line:

$$D/33 \leq NW \leq D/7.$$ [Equation 3]

wherein NW is an integer, and the unit for 7 and 33 is millimeter (MM).

10. The tube-shaped pleated filter member of claim 7, wherein a distance (P) between each corner of the corners of the inner pleated portions has a value between 3 mm and 5 mm.

11. The tube-shaped pleated filter member of claim 1, wherein the filter medium is formed by stacking a plurality of filter materials on each other.

12. The tube-shaped pleated filter member of claim 1, wherein the support unit is formed by curing an adhesive member partially applied to at least one surface of the filter medium, and the adhesive member is applied to a plurality of locations while being spaced apart from each other in the longitudinal direction of the filter body.

13. The tube-shaped pleated filter member of claim 12, wherein the adhesive member is applied over valley and peak formed by the inner pleated portions.

14. The tube-shaped pleated filter member of claim 12, wherein the adhesive member is applied to correspond to the unit wave shape of the inner virtual line.

15. The tube-shaped pleated filter member of claim 1, wherein the support unit includes a cover member positioned on both sides of the filter body to surround and support both inner and outer circumferential surfaces of the filter body.

* * * * *